Patented Jan. 13, 1953

2,625,478

UNITED STATES PATENT OFFICE 2,625,478

MODIFIED LARD AND PROCESS OF PRODUCING SAME

Karl F. Mattil and Frank A. Norris, Chicago, Ill., assignors to Swift & Company, Chicago, Ill., a corporation of Illinois No Drawing. Application September 7, 1950, Serial No. 183,666

19 Claims. (Cl. 99—118)

The present invention relates to the treatment of lard, and more particularly to the production of lard and lard-containing products having improved properties.

Lard, commercially the most important triglyceride material from an animal source, is fat obtained from the fatty tissue of hogs by a heat, solvent or enzyme treatment of the fatty tissue. The most common method of obtaining lard from the fatty tissue of hogs is the so-called wet or steam rendering treatment in which the fat is separated from the tissue by means of pressure with hot water or steam to give what is known as prime steam lard. Another common method of obtaining lard is by the dry rendering process in which fat is removed from the fatty tissues by means of heat alone. The latter method of obtaining lard includes the kettle rendering process in which the fat is melted in a hot water or a steam jacketed kettle. Other methods of obtaining lard, such as solvent and enzymatic treatment of fatty animal tissue, while not widely used on a commercial scale, are potentially important sources of lard.

After recovering the lard from the fatty tissue, the lard is generally treated to impart certain desired characteristics thereto. Thus, the lard may be settled, bleached, refined, washed, filtered, and deodorized to yield a substantially odorless and tasteless product.

Lard is often further treated to impart thereto the desired degree of plasticity, as when the lard is to be used in baked products. This desired plasticity may be obtained by a process which includes compounding therewith hardened lard or an hydrogenated vegetable fat, incorporating air therein and chilling. Of particular importance in the texturizing process is the chilling step. This chilling of the lard may be accomplished by means of chill rolls or an internal chilling machine. In the former method molten fat is picked up on the surface of the internally chilled rotating rolls and then subsequently scraped therefrom and further worked to give the lard a uniform plastic consistency. Chilling by means of an internal chilling machine is accomplished by passing molten fat through a series of vertical or horizontal units where the fat is supercooled and allowed to solidify while being rapidly worked. The lard product treated in the foregoing manner is generally employed as a shortening. Heretofore the plasticity of the final product has depended to a great extent on the nature of the foregoing chilling operation, and the final plasticity has been highly sensitive to the conditions of the chilling step. For this reason the operating conditions in the chilling step have necessarily been very critical and required very careful control.

Another important characteristic of a shortening is its creaming ability. This creaming ability is a measure of the amount of air that can be incorporated into a batter during the mixing operation. The greater the amount of air absorbed and retained by the fat, the greater the leavening effect of the shortening. Thus, for example, the volume of a cake may be increased by the use of shortening possessing superior creaming properties. The creaming ability of a shortening may be determined by measuring the density of the batter or dough, or by measuring the volume of a cake in which the shortening has been incorporated. A high specific gravity indicates a relatively dense mass with only a small amount of incorporated air, while a low specific gravity indicates a light, fluffy mass having a large amount of air incorporated therein. In general, the value of a shortening increases with its ability to absorb air.

Still another very important characteristic of a shortening is its appearance, particularly after being held at the elevated temperatures frequently encountered during distribution and sale of the product. Solidified animal triglyceride material such as lard and lard-containing products frequently have a dull, waxy, and Vaseline-like appearance which becomes progressively more pronounced the longer the product is held. The appearance of lard and lard-containing products is generally considered much inferior to the appearance of vegetable shortenings which have been held under comparable storage conditions, since vegetable shortenings possess a smooth, satiny luster which is retained even after prolonged storage.

While lard has unsurpassed shortening properties, the vegetable shortenings are generally considered to have superior creaming and emulsifying properties as well as improved appearance and storing properties. One of the principal causes for the inferiority of the appearance, storing properties, creaming ability, and emulsifying properties of the lard is the needle-like, crystal formation which the lard glyceride molecules assume upon solidifying and which continue to grow during storage. The long, needle-like crystals impart to lard and lard-containing products the waxy, rubber-like texture or graininess which becomes much more pronounced and highly objectionable on standing at the relatively high temperatures generally encountered when distributing through normal commercial channels. Although it has been found possible to temporarily alter the crystallization pattern of lard by packaging while holding the lard at a carefully controlled, relatively low temperature, the lard crystals soon revert to their natural long, needle-like form when the lard is allowed to stand at room temperature. For this reason the foregoing temperature treatment during the packaging of lard is of no practical value when applied to lard which is to be distributed through normal commercial channels.

In order to overcome the foregoing objectionable properties of lard and lard-containing products which have been found to be attributable to the normal crystallization habit of lard, it is an essential object of the present invention to permanently alter the normal crystallization habit of lard so as to prevent the formation of large, needle-like crystals during crystallization and subsequent storage.

An additional object within the broad scope of the invention is to provide lard in which the heat of crystallization normally associated with the said lard is substantially altered.

Another object of the invention is to provide a product containing lard having improved plastic properties, including improved pliability and workability.

An additional object of the invention is to provide a lard product having improved appearance characterized by a smooth velvety sheen.

A further object of the invention is to provide a lard product having properties which equal or excel those of vegetable shortening while maintaining the superior shortening characteristic of lard.

Still another object of the invention is to provide a lard product having improved baking qualities, including enhanced emulsifying and creaming properties.

A still further object of the invention is to provide a satisfactory lard product which may be texturized with a greater degree of flexibility in the operating conditions.

Still further objects of the invention will be apparent from the following description and claims.

In accordance with the present invention it is proposed to subject lard to a heat treatment in the presence of a substance capable of changing the crystallization properties thereof under conditions which do not cause an appreciable change in the melting point of the glyceride material or a significant change in the distribution of the several types of triglyceride molecules in the fatty material being treated. The reaction which modifies the triglyceride molecules is highly complex and the mechanism is not completely understood. It has been observed, however, that the crystal habit and the heat of crystallization of the triglyceride molecules of lard are very significantly affected. And, since the substances capable of modifying the crystallization properties of triglyceride molecules do not become part of the crystal modified triglyceride molecules, the reaction appears to be catalytic. Therefore, the effective substances are herein referred to as crystal modifying catalysts.

Without limiting the invention to any particular theory or mechanism, it is believed that a more complete understanding of the present invention and of the lard crystal modification reaction will be obtained by considering the reaction mechanism which appears to be supported by the experimental evidence. As only the higher melting point components of lard are crystalline at temperatures of about 68° F. and above, only these higher melting components are believed significant when studying the mechanism which produces the change in the X-ray diffraction pattern of lard and the changes in physical properties coincident therewith. Thus, the trisaturated and disaturated lard triglyceride molecules are considered of primary importance. As reported in the literature and as determined by experimental work, the major production (86 per cent) of the normal crystalline components of natural lard consists of monounsaturated-disaturated triglycerides, such as beta-oleo-palmitostearin, and in their natural state are symmetrical with regard to the unsaturated component (Hildich, The Chemical Composition of Natural Fats, 1941 edition, p. 248, ibid). It has also repeatedly been reported in the literature that these symmetrical monounsaturated-disaturated triglycerides, such as beta-oleo-palmitostearin, form beta-type crystals as their most stable and normal form. However, the normal and stable form of these monounsaturated - disaturated triglycerides having their unsaturated acid groups in a position other than the beta position and thereby having an unsymmetrical configuration with respect to the unsaturated acid, is the beta prime crystal form, the normal crystal form of hydrogenated vegetable oil shortening. Thus, it has been found that when the higher melting point fraction of a triglyceride material is comprised of a major proportion of symmetrical beta-forming triglycerides, such as beta-oleo-palmitostearin, the material will crystallize in the beta form, whereas when this triglyceride material has a major proportion of its higher melting point constituents in the unsymmetrical form, the material will crystallize in the beta prime form, the normal crystal form of hydrogenated vegetable oil shortening, and assumes the appearance and desirable properties associated with hydrogenated vegetable oil shortening. It is therefore believed that the crystal modification of lard is obtained as a result of transforming and isomerizing the naturally occurring symmetrical monounsaturated-disaturated lard triglycerides which comprise the major proportion of the higher melting point constituents of lard into the unsymmetrical isomers which have as their most stable form the beta prime crystal form. The foregoing has been supported by the observations that such isomerization has been obtained without any interesterification taking place whatsoever and, furthermore, when lard is treated in accordance with the herein-disclosed crystal modification process it has been found that there is no appreciable change in the percentage of monounsaturated-disaturated triglycerides of lard as a result of the crystal modification treatment (e. g., 26.4 per cent before modification and 26.8 per cent after modification.

Heretofore when a liquefied glyceride fatty material has been treated with certain catalytic agents, the conditions which have heretofore been employed cause a molecular redistribution of the fatty acid groups between the triglyceride molecules and result in a change in the composition of the glyceride molecules. This redistribution has been termed interesterification or transesterification. The final result of the interesterification is a random distribution of the fatty acid molecules among the glyceride molecules. The interesterification is evidenced by an appreciable change in the melting point of the treated product and in the quantity of the triglyceride material which crystallizes from a solvent for the glyceride product at a specific temperature. For example, when cottonseed oil is interesterified with any of the recognized interesterification catalysts and under conditions employed heretofore, the melting point and consistency of the glyceride material is significantly altered.

In marked contrast with the previous method of catalytically treating triglyceride material, the herein-disclosed crystal modifying treatment does not cause an appreciable change in the melting point of the material, a change in the chemical composition and structure of the fatty acid groups of the glyceride molecules, nor an appreciable change in the proportions of the several types of glyceride molecules in the material being treated. There appears to be no significant amount of interesterification of the glyceride molecules under the conditions employed in the present invention as measured by the increase of trisaturated glycerides, although a small degree of interesterification has been observed to occur during the crystal modifying treatment and to continue after crystal modification has been completed.

More particularly the present invention contemplates heating lard at relatively moderate temperatures above the melting point of the highest melting point components of said glyceride material in the presence of a crystal modifying catalyst for a period sufficient to substantially alter the normal crystallization habits of the triglyceride molecules but without causing any significant amount of interesterification of triglyceride molecules.

It has been found that a number of catalysts are effective in accomplishing the purposes of the present invention. Many organic and inorganic salts have been found to be effective. Among the inorganic salts which have been successfully employed to crystal modify lard are the halides, hydroxides, and sulfates of tin; the halides, oxides, hydroxides, and acetate of zinc; the oxides, carbonate, acetate, and nitrate of lead; halides, hydroxides, acetate and nitrate of cobalt; the halides, hydroxides, carbonates and sulfates of iron; and inorganic salts of antimony, cadmium, nickel, mercury, bismuth, aluminum, magnesium, and titanium. Examples of inorganic salts which have been successfully employed to crystal modify lard are stannous chloride, stannous hydroxide, stannous sulfate, stannic sulfate, and stannic chloride, zinc acetate, zinc chloride, zinc hydroxide, zinc oxide, zinc peroxide, zinc iodide, lead dioxide, lead carbonate, lead acetate, lead nitrate, red lead oxide, cobaltous chloride, cobaltous nitrate, cobaltous hydroxide, cobaltous acetate, ferrous carbonate, ferrous hydroxide, iron subsulfate, ferric chloride, antimony trichloride, cadmium oxide, nickel sulfate, mercuric bromide, aluminum chloride, aluminum stearate, bismuth nitrate, magnesium nitride, and titanium tetrachloride. Other inorganic salts within the classes illustrated and suggested by the foregoing compositions may likewise be employed as catalysts in the present invention.

The effective amount of the foregoing polyvalent metal salts may range from about 0.01 per cent to about 3.0 per cent and higher and preferably between about 0.1 per cent and 2.0 per cent, based on the weight of the fat which it is desired to modify. The catalyst may be added in dry form, in the form of solution, suspension, or by means of a solid carrier, such as kieselguhr. The catalyst may also be added in the form of a saturated solution or slurry, or as a dilute solution, the amount to be added being calculated on the dry weight thereof. It is not desirable to add the crystal modifying catalyst in too dilute a form however, since large dilutions entail the removal of a greater amount of the solvent.

The most desirable concentration of any particular catalyst varies somewhat from catalyst to catalyst, depending largely on the activity of the particular catalyst chosen. In addition to variations due to the activity of the particular catalyst, the optimum concentration of catalyst also depends somewhat upon the condition of the fatty material being treated. For example, when a catalyst such as stannous chloride or stannous hydroxide is employed, it has been observed that a lard having a high peroxide value requires a larger amount of catalyst to completely crystal modify than a lard which has a low peroxide value. It has also been observed that the peroxide value of a lard decreases appreciably when treated with a hydroxide catalyst such as stannous hydroxide. Thus, for example, when the lard to be modified has an initial peroxide value of 60, it has been found desirable to increase the concentration of stannous hydroxide to about 1.0 per cent, whereas the same lard having a peroxide value of around two or three requires only 0.2 per cent catalyst to crystal modify. Similar results have been observed when other catalysts, such as hydrated stannous chloride, are employed as the catalyst. It is therefore desirable to employ a lard having a relatively low peroxide value. It has likewise been found desirable to remove a large part of moisture initially present in the rendered lard before crystal modifying with the herein-disclosed catalysts.

The time of treatment required to crystal modify lard varies between about 30 minutes and 6 hours, and preferably between about 1 hour and 5 hours. The optimum time of treatment required to produce crystal modified lard varies with the temperature, concentration of catalyst employed, and upon the condition of the triglyceride material being treated. Within the effective temperature range it can generally be said that at the lower temperature the speed of reaction is slower. When the concentration of catalyst is reduced below the optimum value, more time is required to complete the crystal modifying reaction. For example, treating lard with .07 per cent stannous hydroxide at a temperature of about 200° C. produces the same significant degree of crystal modification in 5 hours as 0.2 per cent stannous hydroxide employed at the same temperature produces in one hour. Likewise, it has been found that more time is required to complete crystal modification when the lard has been allowed to stand for prolonged periods after rendering and before commencing the crystal modifying treatment. It is therefore desirable to employ a good quality, freshly rendered lard.

The temperature at which crystal modification is effected with the herein-disclosed crystal modifying catalysts varies between about 120° C. and 260° C. and is preferably maintained between about 175° C. and 225° C. While a wider temperature range could be employed, it has been found advisable to conduct the reaction within the above specified temperature range when employing the herein-disclosed catalysts, since at substantially lower temperatures the rate of reaction is so slow as to make the process commercially impractical and at substantially higher temperatures the lard is damaged so as to make its subsequent bleaching and refining too costly for commercial operation.

The above catalysts will be recognized as those of the type known to the prior art as interesterification catalysts and the temperatures given above and elsewhere in the specification will also be recognized as the interesterification temperatures appropriate to such catalysts, although when treating lard there is no substantial net or resultant interesterification since the distribution of fatty acid radicals between the various glyceride molecules is already substantially that which would be produced by any interesterification which might take place.

In order to facilitate the crystal modifying reaction and to reduce to a minimum the amount of catalyst required, it has generally been found advisable to conduct the reaction in a closed system under an inert atmosphere. By excluding air during the treatment, there is less danger of damage being done to the triglyceride material so that the subsequent handling thereof is facilitated and rendered less costly.

The lard may be heated in the presence of the catalyst at any stage of processing, and the beneficial results of the crystal modifying treatment are not impaired by subsequent processing such as deodorization and hydrogenation. It is also unnecessary to hold the crystal modified product at any particular temperature in order to retain the beneficial properties imparted to the material. It is preferred to treat the lard with the catalyst prior to refining thereof. Where it is desired to omit the treatments generally employed to impart improved characteristics, the rendered lard may advantageously be directly heated in the presence of the herein-disclosed catalysts to produce crystal modified lard.

The following specific examples should be considered as merely illustrative of the herein-disclosed process and resulting product and should in no way be construed to limit the invention to the particular materials or conditions disclosed therein:

EXAMPLE I 2,000 grams of killing lard and 15 grams of stannous chloride were heated at 225° C. under 2 to 3 mm. of vacuum for 75 minutes, the mixture being constantly agitated by a stream of water vapor. The treated lard was refined and texturized. A portion of the original killing lard was chilled in a similar fashion for comparison; that is, it was rapidly agitated in an ice bath until plastic. This latter product, after chilling, had a waxy rubbery texture, while the chilled treated lard was softer, more plastic and resembled hydrogenated vegetable shortenings in general appearance. The two samples were tempered at 75° F. and then set at various temperatures for a period of 24 hours. The consistometer readings, obtained with the Bloom consistency tester, are given in the table below and further indicate that a profound change occurred in the crystal nature of the treated lard:

TABLE 1

| Temperature, °F. | Bloom Consistometer Readings | |
| --- | --- | --- |
| | Untreated Lard | Treated Lard |
| 75 | 32–35 | 0 |
| 60 | 44–47 | 17–21 |
| 45 | 79–86 | 85–88 |
| 32 | 150 | 113 |

In accordance with the principle of the Bloom consistency tester, the higher the numerical values, the firmer the lard. Thus, at 75° F. the catalytically treated lard was soft and therefore offered no resistance to the head of the plunger of the consistometer, and therefore a value of zero was obtained. On the other hand, the untreated lard at 75° F. was comparatively firmer and a consequent value of 32 was registered by the gauge.

An X-ray diffraction pattern of the treated lard more closely resembles that of a hydrogenated vegetable shortening than that of the original killing lard, which further illustrates that a fundamental alteration of the crystal nature of the lard has been effected.

In the baking tests with these two lards, the volume of the pound cake obtained with the treated lard was approximately 40 per cent greater than the volume of the cake made with untreated lard. The specific gravity of the batter of the treated lard was 0.800 as compared with 1.035 for the control sample of original lard. The wet cream specific gravity of the treated lard was 0.550 as compared with 0.730 for the control sample of original lard.

The following examples illustrate the treatment of lard with various crystal modifying substances. In all cases the treated lard possessed a striking appearance, which was quite different from that of untreated lard. The treated lard had a characteristic satiny luster that readily distinguished it from conventional lard. In addition the plastic properties of the treated lard were superior, and cakes made therewith had a larger volume and a finer grain and texture than the cakes made with untreated lard, indicating that dough prepared with the modified lard is capable of entrapping greater quantities of air than is the case with dough made with untreated lard. The texture and fine grain of the cakes also indicate a uniform dispersal of the air throughout the dough.

EXAMPLE II 2,300 pounds of bleached prime steam lard were heated to 205° C. for 2.5 hours in the presence of 0.2 per cent stannous chloride, $SnCl_2 \cdot 2H_2O$, based on the weight of the lard. A control sample of the same prime steam lard was heated under the same temperature and time conditions as above but without the catalyst being present. The lard in each instance was cooled to about 66° C., refined, and combined with 135 pounds of hydrogenated triglyceride material (e. g., 50–60 titer lard). The compounded lard was then bleached, deodorized, chilled in standard internal chilling apparatus, and a portion thereof filled into suitable containers under the following filling conditions:

TABLE 2

| Sample | Chilling Temperature in Votator (°F.) | Bloom Consistometer Readings | |
| --- | --- | --- | --- |
| | | Control Sample | Test Sample |
| A | 68 | 0 | 21 |
| B | 66 | 3 | 25 |
| C | 64 | 6 | 25 |

The remainder of each of the above samples of crystal modified lard was stored for 7 days at 75° F. and was filled under the identical conditions employed in Table 1 with the following results:

TABLE 3

| Sample | Chilling Temperature in Votator (° F.) | Bloom Consistometer Readings | |
|---|---|---|---|
| | | Control Sample | Test Sample |
| A | 68 | 9 | 20 |
| B | 66 | 30 | 32 |
| C | 64 | 60 | 30 |

As product control specifications require that the Bloom consistency of the lard fall between 15 and 36, it is evident that only one of the control samples is able to meet the required specifications, whereas each of the test samples comprising crystal modified lard meets the control specifications. The foregoing clearly shows that the chilling temperature in the filling apparatus is less critical for crystal modified lard than for unmodified lard.

TABLE 4

| Analysis | Control Sample | Test Sample |
|---|---|---|
| Titer (° C.) | 41.2 | 41.4 |
| Iodine number | 60.8 | 60.7 |
| Saponification number | 197.5 | 197.3 |
| Glycerine | (1) | (1) |
| Monoglycerides | 0.16 | 0.19 |
| Linoleic acid | 10.7 | 10.3 |
| Linolenic acid | 0.65 | 0.62 |

[1] Less than 0.5%.

It is evident from the foregoing that there has been no appreciable change in the chemical composition of the lard after treatment.

The treated lard possessed a smooth, velvety sheen and was superior in appearance and in textural properties to the control sample.

EXAMPLE III 80 pounds prime steam lard were combined with 0.2 per cent stannous chloride based on the weight of the lard and heated for 5 hours in a deodorizer at 202° C. (395° F.). Samples of lard being treated were taken at the intervals indicated in the following table:

TABLE 5

| Sample No. | Time (min.) | Temperature (° F.) | Free Fatty Acid (Percent) | Titer (° C.) | Melting Pt. (° F.) | Sap. No. |
|---|---|---|---|---|---|---|
| Orig | 0 | 75 | 0.95 | 36.8 | 110 | 195.7 |
| 1 | 0 | 390 | 1.63 | 37.0 | 108 | 197.9 |
| 2 | 30 | 395 | 2.08 | 36.1 | 107 | 197.0 |
| 3 | 60 | 395 | 2.09 | 37.0 | 107 | 196.9 |
| 4 | 120 | 395 | 2.06 | 36.6 | 108 | 197.0 |
| 5 | 180 | 395 | 1.91 | | | |
| 6 | 300 | 395 | 1.68 | 36.7 | 107 | 196.6 |

It is evident from the foregoing table that there has been no significant change in the lard during the catalytic heat treatment, except that the free fatty acid content had increased somewhat above its initial value of 0.95 per cent. The slight drop in the melting point which takes place during the initial stage of treatment is not considered significant since it does not alter the subsequent processing conditions employed in texturizing and compounding the lard into a conventional shortening product. For example, the chilling temperature in the internal chilling machine used in texturizing is not changed, nor is the quantity and type of hard fat combined with the treated lard to form a conventional compounded shortening altered.

Each of the foregoing hourly samples were refined with caustic, filtered, and formulated with hard lard in the conventional manner on the standard basis of 85 per cent crystal modified lard and 15 per cent hard lard (50-60 titer). The formulated lard was texturized and stored at a temperature of about 77° F. The following performance data was obtained:

TABLE 6

| Sample | Bloom Consistency Readings at 77° F. | Pound Cake | | Wet Cream Test, Sp. Gravity |
|---|---|---|---|---|
| | | Volume (cc.) | Batter, Sp. Gravity | |
| Orig | 46 | 1,330 | .800 | .570 |
| 1 | 39 | 1,300 | .810 | .595 |
| 2 | 25 | 1,375 | .770 | .515 |
| 3 | 19 | 1,405 | .745 | .505 |
| 4 | 18 | 1,430 | .715 | .460 |
| 5 | 15 | 1,450 | .705 | .450 |
| 6 | 9 | 1,490 | .695 | .435 |

The compounded lard exhibits a gradual decrease in consistency readings as the duration of the catalytic treatment increases. Simultaneously, the volume of the pound cake increases while the specific gravity of pound cake batter and the wet cream test decreases. In each instance the volume of the pound cake obtained with the crystal modified lard is substantially greater than that obtained from a similar lard shortening which does not include crystal modified lard as the basic constituent thereof. Likewise, the specific gravity of the pound cake batter and the wet cream test is less than the corresponding specific gravity obtained with a lard shortening which does not have crystal modified lard as the base thereof. There does not appear to be any advantage in prolonging the treatment substantially beyond 5 hours.

The treated samples possessed a smoother, more velvety appearance and had improved textural properties when compared with the control sample of lard.

EXAMPLE IV 25,000 pounds of prime steam lard having added thereto 0.2 per cent stannous chloride based on the weight of the lard was heated in a converter under 5 pounds hydrogen pressure at about 200° C. for a period of 4 hours. Samples were taken at one-hour intervals.

TABLE 7

| Sample No. | Time (hrs.) | Free Acid (Percent) | Melting Point (° F.) | Saponification No. | Iodine No. |
|---|---|---|---|---|---|
| Orig | 0 | 0.43 | 108 | 195.2 | 69.8 |
| 1 | (1) | 1.08 | 107 | 195.0 | 69.4 |
| 2 | 1 | 1.08 | 104 | 195.4 | 69.4 |
| 3 | 2 | 1.10 | 104 | 195.6 | 69.1 |
| 4 | 3 | 1.12 | 102 | 195.8 | 69.9 |
| 5 | 4 | 1.13 | 102 | 195.6 | 69.8 |

[1] At 395° F.

With the exception of an increase in the free fatty acid content, there is no significant change in the lard after treatment. The slight lowering of the melting point indicates no significant alteration of the melting point characteristics of the treated lard.

Samples of the above lard were refined, bleached, and then chilled while being agitated. There was a very apparent difference in the appearance of the texturized products. The original lard heated without a catalyst had a waxy appearance whereas the final sample taken at the end of the 4-hour treating period had a velvety sheen and a smooth, creamy consistency. Also, when temperature readings of samples of the crystal modified lard and the unmodified lard were taken while being chilled either before or after compounding and the readings plotted on temperature-time coordinates, uniform cooling curves were obtained with the samples containing the crystal modified lard, whereas there was a noticeable irregularity in the cooling curves of the control samples of unmodified lard.

The foregoing samples were stored at 75° F. for 5 days and then were tested to determine the specific gravity in the wet cream test and the volume of a pound cake produced by the said lard.

TABLE 8

| Sample No. | Wet Cream Specific Gravity | Pound Cake Volume (cc.) |
|---|---|---|
| Orig | .860 | 900 |
| 1 | .775 | 900 |
| 2 | .745 | 910 |
| 3 | .705 | 975 |
| 4 | .635 | 1,100 |
| 5 | .545 | 1,225 |

The X-ray diffraction patterns of the above samples of lard show that there has been a progressive reorientation of the crystal structure thereof during the treating period, also with secondary fundamental changes occurring, making the crystal modified lard diffraction pattern resemble more closely that of vegetable shortening than the original untreated lard.

Each of the above samples of lard was formulated into a shortening by compounding 85 per cent treated lard with 15 per cent hard fat (50–60 titer lard) to give the standard consistency, and then chilling while being rapidly agitated (texturized). The samples were then held at 75° F. for 4 days and tested by the bakery for the specific gravity of the wet cream test and the volume of a pound cake produced by the said shortening.

TABLE 9

| Sample No. | Wet Cream Sp. Gr. | Pound Cake Volume (cc.) |
|---|---|---|
| 0 | .640 | 1,375 |
| 1 | .605 | 1,380 |
| 2 | .560 | 1,450 |
| 3 | .550 | 1,465 |
| 4 | .575 | 1,405 |
| 5 | .600 | 1,400 |

The above samples were also stored at a temperature of 97° F. and periodically compared with a control sample of the original lard which had not been heated in the presence of a catalyst. While both the control and the crystal modified lard-containing sample exhibited a very satisfactory appearance at the end of the third day, there was a very noticeable difference between the two samples by the end of the second week. The control sample appeared to have a dull appearance and a stiff or relatively hard, crinkly texture, whereas the crystal modified lard-containing sample retained its original velvety sheen and smooth creamy texture. As the holding period continued, the foregoing differences were even more apparent, with the crystal modified sample retaining its attractive appearance for 7 weeks, at which time the test was terminated.

After holding the control and test sample No. 3 for a period of four and a half weeks at 97° F., portions thereof were returned to 75° F. and tested in the bakery to give the following results:

TABLE 10

| Test | Shortening, Control Sample | Shortening, Crystal Modified Sample #3 |
|---|---|---|
| Specific Gravity of pound cake batter | 1.000 | .760 |
| Volume of pound cake cc | 1,050 | 1,410 |

The foregoing data clearly shows that the compounded shortening containing crystal modified lard retains most of its improved appearance and cake-baking properties on storage at an elevated temperature, whereas the shortening containing unmodified lard becomes very poor in appearance, texture, and cake-baking ability under the same storage conditions. It should be particularly noted that the volume of the pound cake produced by the shortening containing crystal modified lard was 1465 cc. (Table 9) prior to storing at 97° F. and was 1410 cc. (Table 10) after storing at 97° F. for four and a half weeks. In contrast therewith, the volume of the pound cake produced by the shortening containing unmodified lard decreased sharply from 1375 cc. (Table 9) to 1050 cc. (Table 10) on storing at 97° F. for four and a half weeks. Similar comparative results have been obtained on holding for a prolonged period uncompounded crystal modified lard and compounded shortenings containing hardened vegetable or animal fat, with and without mono and diglycerides being added in the conventional amounts. This ability of crystal modified lard and compounded shortenings made therefrom to retain their improved appearance, texture and cake-baking properties after prolonged storage and on storage under adverse conditions is an extremely important characteristic of crystal modified lard. And, even when the increase in the volume of a pound cake produced by the crystal modification treatment is considered only moderate as compared with the original lard, it has been consistently observed that the lard treated in accordance with the herein-disclosed process and shortenings made therewith retain their original desirable appearance, textural, and performance characteristics for a prolonged period of storage under adverse conditions, whereas the untreated lard and shortening products made therefrom lose their desirable characteristics in a relatively short time.

EXAMPLE V 2,000 grams of prime steam lard were heated to 168° C. and mixed with 0.7 per cent solid stannous hydroxide supported on kieselguhr. After addition of the catalyst the mixture was heated to 224° C. and the temperature maintained at 224° C. for 2 hours under an inert atmosphere of nitrogen. At the same time an equal quantity of prime steam lard was treated in a similar fashion except that the addition of a catalyst was omitted. At the end of the heating period both samples of lard were refined with 15.4 grams of an 85 per cent solution of phosphoric acid by stirring a few minutes at 71° C. A diatomaceous earth such as fuller's earth was then added and the temperature then raised to 82° C. with stirring. The products were filtered and then texturized by chilling with rapid agitation in an ice bath until plastic. The melting point of the treated lard was 106° F., as compared with 107° F. for the untreated sample, a variation which is considered to be insignificant and which indicates no significant alteration of the melting point characteristics of the treated lard.

Samples of the treated and untreated lard were left overnight at 75°, 60°, 42°, and 32° F. and consistencies of the samples then determined, using the consistency tester described in U. S. Patent 2,119,699 to Bloom.

TABLE 11

| Temperature, °F. | Bloom Consistency Readings | |
|---|---|---|
| | Untreated Lard | Treated Lard |
| 75 | 20 | 0 |
| 60 | 52 | 6 |
| 42 | 80 | 83 |
| 32 | 145 | 150 |

The foregoing tests indicate that although no substantial change in melting point characteristic was evidenced, a drastic change of the crystal nature of lard by the catalytic treatment thereof was effected.

A cake baking test was then performed, the test being further evidence of a profound difference between catalytically treated lard and lard which had not so been treated, as above described. Two pound cakes were made, employing the same amounts of ingredients, including fat, and the same conditions of baking. The only difference in the preparation of the two cakes was the addition of catalytically treated lard to the batter of one cake and untreated lard to the other. The batter made with treated lard had a specific gravity of 0.870 while the batter of the cake made with untreated lard had a specific gravity of 1.090. The cake which was baked with treated lard showed an increase of volume of more than 40 per cent over the volume of the other cake. Moreover, the pound cake made with treated lard had a grainy, even texture while the cake made with ordinary lard had a dense, soggy texture with dense centers of agglutinated dough dispersed throughout the mass.

When 100 grams of the above treated lard was dissolved in 1000 grams of petroleum ether and stored for 5 days at 45° F., 3.8 grams of solid triglyceride crystallized from the solvent as compared with the 3.7 grams of solid material crystallized from untreated lard under the foregoing conditions. It is evident there has been no significant change in the proportion of the higher melting point constituents as a result of the herein-disclosed crystal modification treatment.

EXAMPLE VI 2,500 pounds of bleached prime steam lard was pumped into a converter and thoroughly dried by heating at a temperature above 100° C. Thereafter 0.2 per cent freshly prepared stannous hydroxide based on the weight of the lard was mixed with the dry lard and heated to a temperature of 205° C. while agitating normally and under a pressure of 30 pounds of hydrogen. Samples were taken of the original lard, and at the end of each hour of heating. Each sample was cooled to 150° F., filtered, and pumped to a refining tank where it was washed with 20 per cent water based on the weight of the lard for 20 minutes and then passed through a centrifuge. The treated samples were then deodorized and bleached in accordance with regular plant practice and filtered under normal operating conditions. Each sample was analyzed with the following results:

TABLE 12

| Sample | Time (hrs.) | Melting Pt. (°F.) | Free Fatty Acid (Percent) | Iodine No. | Spect. Analyses | | | |
|---|---|---|---|---|---|---|---|---|
| | | | | | Linol. | Linolen. | Arach. | Conj. Di. |
| A | 0 | 109 | 0.45 | 67.5 | 10.42 | 0.46 | 0.39 | 0.22 |
| B | 1 | 106 | 1.0 | | | | | |
| C | 2 | 105 | 1.05 | | | | | |
| D | 3 | 104 | 1.20 | | | | | |
| E | 4 | 104 | 0.95 | 68.2 | 10.41 | 0.48 | 0.37 | 0.23 |
| F | 5 | 105 | 1.05 | | | | | |

TABLE 13

| Sample | Bloom Consistometer Readings | Set Point (°F.) | Pound Cake | | Wet Cream, Sp. Gr. |
|---|---|---|---|---|---|
| | | | Sp. Gr. | Volume (cc.) | |
| A | 64 | 41.6 | 0.770 | 1,265 | 0.585 |
| B | 40 | 41.4 | 0.700 | 1,380 | 0.515 |
| C | 32 | 41.3 | 0.730 | 1,360 | 0.550 |
| D | 35 | 41.3 | 0.740 | 1,295 | 0.535 |
| E | 35 | 41.2 | 0.745 | 1,310 | 0.565 |
| F | 37 | 41.2 | 0.750 | 1,300 | 0.570 |

It is apparent from the foregoing table that whereas there is a continuing change in the lard after the second hour of treatment, there is no advantage in prolonging the treatment and an actual disadvantage in so doing since the volume of the pound cake decreases and the specific gravities increase. Under the foregoing conditions, it is evident that crystal modification is complete between the first and second hour of treatment.

When a small portion of sample C was texturized by chilling and agitating, it was evident that an unusually large volume of air was occluded in the crystal modified lard during the texturizing operation. On standing, the sample exhibited a remarkable ability to retain the occluded air, and even when the sample was heated on a steam bath, much of the air was retained by the melted lard. This ability of the treated lard to retain a relatively large volume of air, even at an elevated temperature, may account for the crystal modified lard producing pound cakes of substantially increased volumes.

EXAMPLE VII 2,000 grams of prime steam lard were mixed with a 1.0 per cent stannic chloride based on the weight of the lard to form a uniform mixture, and heated in an open flask for one hour at 200° C. with constant stirring. At the end of the foregoing heating period the treated lard was refined, bleached, and filtered.

The lard treated in the foregoing manner gave much lower Bloom consistency readings at temperatures above 45° F. than untreated lard and retained a substantially larger volume of air and had a lower specific gravity after texturizing than did the control sample of unmodified lard.

EXAMPLE VIII 2,000 grams of prime steam lard were admixed with 2.0 per cent stannous sulfate based on the weight of the lard to form a uniform mixture, and heated in an open flask at 200° C. for 5 hours with constant stirring. The treated lard was refined, bleached, and filtered.

The treated lard gave much lower Bloom consistency readings at temperatures above 45° F. than the untreated lard, retained a substantially larger volume of air, and had a much lower specific gravity than the control sample of unmodified lard.

EXAMPLE IX 2,000 grams of prime steam lard were admixed with 2.0 per cent stannic sulfate based on the weight of the lard to form a uniform mixture, and then heated in an open flask at 200° C. for 3 hours with constant stirring.

The treated lard had substantially lower Bloom consistency readings at temperatures above 45° F. and possessed superior textural properties since it retained substantially larger volumes of air when texturized.

EXAMPLE X 2,000 grams of prime steam lard were admixed with 0.5 per cent bismuth nitrate based on the weight of the lard to form a uniform mixture, and heated in an open flask for 2.5 hours at a temperature of 225° C. with constant stirring. At the end of the heating period, the treated lard was refined, bleached, and filtered.

The crystal modified lard produced by the foregoing treatment gave much lower Bloom consistency readings at temperatures above 45° F., retained a substantially larger volume of air, and possessed a lower specific gravity after texturizing than the unmodified control sample.

When made into a compounded shortening by mixing 86 per cent of the modified lard with 14 per cent hardened lard (50-60 titer) and incorporated in the conventional pound cake batter, a pound cake having a volume of 1460 cc. was obtained and a pound cake batter having a specific gravity of 0.730. The wet cream specific gravity was 0.520. The unmodified lard compounded in the foregoing manner produced a pound cake having a volume of 1300 cc., a batter specific gravity of 0.825, and a wet cream specific gravity of 0.590.

EXAMPLE XI 2,000 grams of dried prime steam lard were admixed with 0.1 per cent aluminum chloride and heated in an open flask to 200° C. for a period of 4 hours, and samples were taken at the end of each one-hour period of heating.

TABLE 14

| Time Sample Treated (Hours) | Free Fatty Acid (Per cent) | Bloom Consistency Readings |
|---|---|---|
| 1 | 1.2 | 33 |
| 2 | 1.3 | 32 |
| 3 | 1.4 | 35 |
| 4 | 1.6 | 44 |

Each of the samples was refined, bleached, filtered, and compounded with 14 per cent hardened lard (50-60 titer) based on the weight of the treated lard to form a blended shortening. Each sample was examined in the bakery laboratory with the following results:

TABLE 15

| Time Sample Treated (hrs.) | Pound Cake | | Wet Cream, Sp. Gr. |
|---|---|---|---|
| | Specific Gravity | Volume (cc.) | |
| 1 | .815 | 1,375 | .625 |
| 2 | .675 | 1,400 | .590 |
| 3 | .785 | 1,360 | .615 |
| 4 | .785 | 1,355 | .650 |

It is evident from the foregoing table that the optimum results are obtained by heating the prime steam lard for 2 hours in the presence of the aluminum chloride under the specified conditions. When heating is prolonged appreciably, it appears that the lard is adversely affected, since the consistency increases and the volume of the pound cake decreases significantly.

EXAMPLE XII 2,000 grams of bleached, prime steam lard were admixed with 0.1 per cent titanium tetrachloride based on the weight of the lard, and heated in an open flask at a temperature of 200° C. for one hour with constant stirring. At the end of the heating period the treated lard was refined, bleached, and filtered.

The treated lard gave lower Bloom consistency readings at temperatures above 45° F., retained a substantially larger volume of air when texturized, and had a more attractive velvety sheen and smoother texture than the control sample of unmodified lard.

When made into a compounded shortening by mixing 86 per cent of the modified lard with 14 per cent hardened lard (50-60 titer) and incorporated in the conventional pound cake batter, it produced a pound cake having a volume of 1425 cc. and a batter specific gravity of 0.780. The wet cream specific gravity was 0.575. The unmodified lard compounded in the foregoing manner produced a pound cake having a volume of 1270 cc., and a batter specific gravity of 0.820, and a wet cream specific gravity of 0.610.

EXAMPLE XIII 2,000 grams of bleached prime steam lard were heated in an open flask admixed with 2.0 per cent aluminum stearate based on the weight of the lard at a temperature of 200° C. for one hour with constant stirring. The treated lard was then refined, bleached, and filtered.

The treated lard had the characteristic properties of crystal modified lard, and when compounded by mixing 86 per cent of the treated lard with 14 per cent hard lard (50-60 titer) and incorporated in the conventional pound cake batter, it produced a pound cake having a volume of 1445 cc. and a batter specific gravity of 0.760. The wet cream specific gravity was 0.550. The unmodified lard compounded in the foregoing manner produced a pound cake having a volume of 1310 cc., a batter specific gravity of 0.825, and a wet cream specific gravity of 0.595.

EXAMPLE XIV 2,000 grams of bleached prime steam lard were heated in an open flask admixed with 2.0 per cent magnesium nitride based on the weight of the lard at a temperature of 225° C. for a period of 4 hours with constant stirring. The treated lard was refined, bleached, and filtered, and was found to possess characteristic properties of crystal modified lard.

EXAMPLE XV 2,000 grams of prime steam lard were admixed with one-half per cent lead dioxide based on the weight of the lard, and heated in an open flask at a temperature of 200° C. for 2 hours with constant stirring. The lard was then refined, bleached, and filtered, and exhibited characteristic properties of crystal modified lard by giving lower Bloom consistency readings at temperatures above 45° F. and retaining an increased volume of air when texturized. The treated lard produced a pound cake having a volume of 1325 cc. and a batter specific gravity of 0.785. The unmodified lard produced a pound cake having a volume of 1100 cc. and a batter specific gravity of 0.950.

EXAMPLE XVI 2,000 grams of bleached, prime steam lard were admixed with one-half per cent lead carbonate, $(PbCO_3)_2Pb(OH)_2$, based on the weight of the lard, and heated in an open flask at a temperature of 200° C. for a period of 3 hours with constant stirring. The lard was then refined, bleached, and filtered.

The treated lard possessed the characteristic properties of crystal modified lard, and when used in baking the conventional pound cake produced a larger pound cake volume than the control sample of unmodified lard.

EXAMPLE XVII 2,000 grams of prime steam lard were admixed with one-half percent zinc chloride based on the weight of the lard, and heated in an open flask at a temperature of 200 C. for a period of 3 hours with constant stirring. The treated lard was refined, bleached, and filtered.

The treated lard possessed the characteristic properties of crystal modified lard in that it exhibited lower Bloom consistency readings with temperatures above 45° F. and retained a substantially larger volume of air when texturized than the control sample of unmodified lard.

EXAMPLE XVIII 2,000 grams of prime steam lard were admixed with 0.2 per cent zinc acetate based on the weight of the lard, and heated in an open flask at a temperature of 200° C. for a period of 4 hours with constant stirring. The lard was then refined, bleached, and filtered.

The treated lard exhibited the characteristic properties of crystal modified lard.

EXAMPLE XIX 2,000 grams of prime steam lard were admixed with 2.0 per cent cobalt nitrate based on the weight of the lard, and heated in an open flask at a temperature of 225° C. for 2 hours with constant stirring. The lard was then refined, bleached, and filtered.

The treated lard exhibited a lower Bloom consistency at temperatures above 45° F. and retained a larger volume of air when texturized than the control sample of unmodified lard.

EXAMPLE XX 2,000 grams of bleached prime steam lard were admixed with 2.0 per cent cobalt chloride based on the weight of the lard, and heated in an open flask at a temperature of 245° C. for a period of 3 hours with constant stirring. The lard was then refined, bleached, and filtered.

The treated lard possessed the herein-disclosed characteristics of crystal modified lard.

EXAMPLE XXI 2,000 grams of bleached prime steam lard were admixed with 1.0 per cent ferric chloride based on the weight of the lard, and heated in an open flask at a temperature of 219° C. for 30 minutes with constant stirring. The lard was then refined, bleached, and filtered.

The treated lard exhibited a lower Bloom consistency at temperatures above 45° F., and when used in baking a pound cake produced a cake having a substantially larger volume than the control sample of unmodified lard.

EXAMPLE XXII 2,000 grams of bleached, prime steam lard were admixed with 2.0 per cent iron subsulfate, $Fe_4O(SO_4)_5$, based on the weight of the lard, and heated in an open flask at a temperature of 175° C. for 6 hours with constant stirring. The lard was then refined, bleached, and filtered and possessed the characteristic properties of crystal modified lard.

EXAMPLE XXIII 2,000 grams of prime steam lard were admixed with 2.0 per cent cadmium oxide based on the weight of the lard, and heated in an open flask at a temperature of 200° C. for one hour with constant stirring. The lard was then refined, bleached, and filtered.

The treated lard exhibited a lower Bloom consistency at temperatures above 45° F. and retained an appreciably larger volume of air when texturized than did the control sample.

EXAMPLE XXIV 2,000 grams of prime steam lard were admixed with 2.0 per cent antimony trichloride based on the weight of the lard, and heated in an open flask at a temperature of 220 C. for a period of 2.5 hours with constant stirring. The lard was then refined, bleached, and filtered.

The treated sample gave a much lower Bloom consistency reading at temperatures above 45° F. than the untreated lard and retained a substantially larger volume of air when texturized than did the control sample.

In order to determine suitable catalysts and optimum operating conditions for the herein-disclosed crystal modifying treatment, it has been found necessary to employ one or more empirical tests. For example, it has been the practice to run a wet cream test, a water absorption test, and pound cake baking test on the crystal modified lard or on the shortening comprising the crystal modified lard. By comparing the results of the foregoing tests on the treated lard with the results obtained on the control sample, it is possible to chart the course of the crystal modifying reaction and to determine when the crystal modifying treatment has taken place. Thus, when one observes a substantial decrease in the specific gravity of the lard-water emulsion in the wet cream test, a substantial increase in the amount of water which is taken up by the crystal modified material in the water absorption test, or an appreciable increase in the volume of a pound cake in the baking test, crystal modification will have taken place. Other tests based on the herein-disclosed characteristics of crystal modified lard may be conducted, such as taking Bloom consistency readings of the product being treated at temperatures above about 45° F., as the crystal modified product exhibits a substantially lower consistency between about 45° F. and the melting point of the product than does the unmodified lard at the same temperature.

While the foregoing wet cream test, water absorption test, and pound cake baking test are well known to those skilled in the art, the precise procedure employed in conducting these tests is as follows:

Wet cream test

FORMULA 530 grams confectionary sugar
414 grams shortening
56 grams water

METHOD

Have all ingredients at 75° F. Place these ingredients in a 10 quart mixing bowl of a Hobart C-10 machine or the equivalent. Mix for one-half minute at low speed. Scrape down the bowl and beater and then mix for five minutes at second speed. Weigh a representative 200 cc. portion of the creamed mass to obtain the specific gravity. Continue creaming at second speed, and take gravity readings again at 15 minutes and at 25 minutes. The bowl and beater should be scraped down after each gravity reading.

Total mixing time at second speed: 25 minutes
Gravity readings to be reported: 5, 15, and 25 minute intervals Convert weighings into specific gravity and report as grams per cc.

Water absorption test

Place one pound (454 grams) of shortening material at 75° F. into the 10 quart mixing bowl of the bench Hobart model C-10 or equivalent mixer. Mix for one-half minute at second speed. Scrape down bowl and beater. Water at 75° F. is then added by means of a mayonnaise oil dripping tank at the rate of 30 cc. per minute, the machine running continuously at second speed.

The machine should be stopped at intervals and the water shut off in order to inspect the mix for unemulsified droplets of water. During these inspections, the upper rim of the mix should be scraped down. When droplets of water are present on the surface of the beaten shortening material, the machine should be turned on and run for two mintues with the water shut off. If the droplets are still present, the test is completed. If the droplets are absorbed, more water should be added until the above procedure shows unemulsified droplets present.

To maintain a constant flow of water (30 cc. per minute) a constant level should be kept in the salad oil tank. Report the grams of water emulsified by 1 pound of the shortening material.

Pound cake baking test (without monoglycerides)

FORMULA

| | Lbs. | Ozs. |
|---|---|---|
| Group 1: | | |
| Shortening material (containing no monoglycerides) | 0 | 12 |
| Sugar | 1 | 8 |
| Flour (cake) | 0 | 12 |
| Salt | 0 | ¼ |
| Vanilla | 0 | ¼ |
| Milk | 0 | 5 |
| Group 2:[1] | | |
| Milk | 0 | 8 |
| Eggs | 0 | 12 |
| Group 3: Flour (cake) | 0 | 12 |

[1] Stir together well.

METHOD

Have all ingredients at 75° F.

Weight the ingredients of group 1 into the 10-quart bowl of the bench Hobart model C-10 mixer, mix at first speed for 30 seconds and scrape down the bowl. (Note.—This is a preliminary mixing period and is not included in the following mixing times.)

Cream 2 minutes at second speed and scrape down the bowl.

Cream 2 minutes at second speed, and again scrape down the bowl.

Cream at first speed for 1 minute, adding one-half of the ingredients of group 2 during the first 20 seconds. Add the ingredients of group 3 and cream 1 minute at first speed.

Cream 1 minute at first speed, adding the other one-half of the ingredients of group 2 during the first 20 seconds.

Take specific gravity of the batter and scale 510 grams of the batter into a standard, paper-lined loaf pan. Bake 65 to 70 minutes at 360° F. Allow cake to cool to room temperature before measuring.

Report volume of finished cake and specific gravity of batter; also consistency and appearance of batter.

Pound cake baking test (with monoglycerides)

FORMULA

| | Lbs. | Oz. |
|---|---|---|
| Group 1: | | |
| Shortening material (containing monoglycerides) | 1 | 7 |
| Sugar, fine granulated | 2 | 7 |
| Salt | 0 | 1 |
| Flour (cake) | 2 | 0 |
| Group 2: | | |
| Milk | 1 | 0 |
| Vanilla | 0 | ½ |
| Group 3: Whole eggs | 1 | 7 |

METHOD

Have all ingredients at 75° F. Mix at first speed.

Scale the ingredients of group 1 into the 10-quart Hobart C-10 mixer bowl in the order given. Scale the ingredients of group 2 separately and pour into the bowl with the ingredients of group 1, starting the machine immediately, very slowly, so that the liquid and dry ingredients pick up without splashing. Mix for one-half minute and scrape down the bowl and beater. Mix for 3 minutes, not including the one-half minute interval at the beginning. Scrape down again and continue mixing for an additional 3-minute interval. Scrape down.

Add one-third of the eggs (75° F.) and mix 1 minute. Stop the machine and add one-third of the eggs. Mix another minute, then stop the machine. Add the final portion of the eggs, scrape down well, and continue mixing for 2 minutes to bring the total mixing time to 10 minutes. Take the specific gravity.

Scale 510 grams of the batter into a regulation paper-lined loaf pound cake pan and bake at 360° F. for 70 minutes. The maximum allowable variation in baking time should not exceed 5 minutes, depending on the load of the oven. Remove from the pan immediately after baking. Allow to cool to room temperature before measuring in the volumeter.

a. Report specific gravity reading at 10 minutes in grams per cc.
b. Report batter temperature.
c. Report the cake volume in cc.
d. In addition, report such observations as consistency of the batter, appearance of the top crust and grain and texture of the cake.

From the foregoing specific examples describing the characteristics and improved properties of crystal modified lard it will be very apparent to those skilled in the art that crystal modified lard is particularly useful in the preparation of improved shortening products. Thus, any shortening product which has heretofore consisted of a substantial proportion of animal triglyceride material, such as lard, will be provided with very substantially improved baking and storage properties as well as improved appearance, particularly after holding at moderate or elevated temperatures by substituting crystal modified lard for all or part of the unmodified lard in the shortening. The resulting shortening product has been found to have the desirable properties characteristic of an all vegetable shortening while retaining the superior shortening properties of lard. Further evidence of the fundamental alteration of the crystal structure of the lard toward that of a vegetable shortening is evident on observing that the X-ray diffraction pattern of the treated lard much more closely resembles the pattern of a hydrogenated vegetable shortening than that of the original lard. The foregoing has been found to be true in all types of compounded animal fat and animal-vegetable shortenings where the said shortenings contain added animal or vegetable hard fats and monoglycerides or are hydrogenated. Significantly, the improved results obtained with crystal modified lard are in no way dependent upon the presence of monoglycerides since the desirable properties are enhanced by deodorization treatment.

It should thus be apparent that the improved lard obtained in accordance with the invention described herein can be used as an all-purpose shortening in place of both the animal and vegetable shortenings heretofore discriminately employed because of their peculiar properties. The improved lard may thus be advantageously employed in the manufacture of cakes and icings as well as in the preparation of bread and pie crust. Although we have illustrated the invention as being particularly applicable to baked goods, it is also applicable to other food products, such as the manufacture of candy and fried products. It is also understood that the improved fat may be advantageously used in lubricants, greases, cosmetics, medicated ointments, and in many other industrial applications.

When employing the herein-disclosed polyvalent metallic salt catalysts other than the tin salts, the problem of decolorizing the crystal modified lard is generally quite serious if the product is intended to be edible. For this reason applicants prefer to employ the salts such as stannous chloride or stannous hydroxide when treating lard of an edible grade. In many instances, however, complete decolorization is not required and in these instances it is possible to employ any of the polyvalent metallic salt crystal modifying catalysts.

This application is a continuation-in-part application of U. S. patent application Serial No. 724,468, filed January 25, 1947.

Obviously, many modifications and variations of the invention as hereinbefore set forth may be made without departing from the spirit and scope thereof, and therefore only such limitations should be imposed as are indicated in the appended claims.

We claim:

1. The process of treating a lard to permanently alter the normal crystallization habit and improve the appearance and keeping qualities thereof, which comprises subjecting lard to a heat treatment at a temperature between about 120° C. and 260° C. for a period of between about one-half and six hours in the presence of a small amount of a polyvalent metallic compound acting as a crystal modifying catalyst to permanently alter the crystal habit of the lard without causing a significant amount of interesterification.

2. The process substantially as described in claim 1 wherein the heat treatment is at a temperature between about 175° C. and 225° C. and for a period of between about one and five hours.

3. The process substantially as described in claim 2 wherein the polyvalent metallic compound acting as the catalyst is a tin salt.

4. The process substantially as described in claim 2 wherein the polyvalent metallic compound acting as the catalyst is a stannous salt.

5. The process substantially as described in claim 2 wherein the polyvalent metallic compound acting as the catalyst is a stannic salt.

6. The process substantially as described in claim 2 wherein the polyvalent metallic compound acting as the catalyst is stannous chloride.

7. The process substantially as described in claim 2 wherein the polyvalent metallic compound acting as the catalyst is stannic chloride.

8. The process substantially as described in claim 2 wherein the polyvalent metallic compound acting as the catalyst is stannous hydroxide.

9. The process substantially as described in claim 2 wherein the polyvalent metallic compound acting as the catalyst is stannous sulfate.

10. The process substantially as described in claim 2 wherein the polyvalent metallic compound acting as the catalyst is stannic sulfate.

11. The process of treating a lard to permanently alter the normal crystallization habit and improve the appearance and keeping qualities thereof, which comprises subjecting lard to a heat treatment in a closed system at a temperature between about 200° C. and 225° C. for a period of between about two and five hours in the presence of between about 0.1 and 2 per cent based on the weight of the lard of the crystal modifying catalyst stannous chloride to permanently alter the crystal habit of the lard without causing a significant amount of interesterification.

12. As a product of manufacture, a modified lard of improved physical appearance and plastic properties, said lard having the crystal structure and X-ray diffraction pattern thereof permanently altered and having at above about 45° F. a substantially lower consistency than the unaltered lard and having a satiny luster and textural properties characteristic of hydrogenated vegetable shortening and an X-ray diffraction pattern substantially that of hydrogenated vegetable shortening.

13. As a product of manufacture, a permanently modified lard having a melting point substantially the same as that of the original lard, a softer consistency at high temperatures and a harder consistency at low temperatures than the original lard within the range of temperatures in which lard is semisolid, and having a stable crystal structure when cool providing an X-ray diffraction pattern resembling that of hydrogenated vegetable oil shortening and differing substantially from that of unmodified lard.

14. A product as defined in claim 13, in which a small amount of a hardened fat is admixed with said modified lard.

15. A product as defined in claim 14, in which the hardened fat is vegetable hardened fat.

16. As a product of manufacture, a permanently modified lard having a melting point substantially the same as that of the original lard, a softer consistency at high temperatures and a harder consistency at low temperatures than the original lard within the range of temperatures in which lard is semisolid, and having a stable crystal structure when cool providing an X-ray diffraction pattern resembling that of hydrogenated vegetable oil shortening and differing substantially from that of unmodified lard, the cooled lard having a smooth, satiny luster after storage, as contrasted with the characteristic, dull waxy appearance of unmodified lard.

17. In a process of treating lard, the steps of contacting the lard with an interesterification catalyst and subjecting said lard while in liquid phase and in contact with said catalyst to an interesterification temperature to permanently modify the crystallization properites of said lard.

18. The process as defined in claim 17, in which the treatment is continued until the crystallization properties of said lard are substantially completely modified.

19. In a process of treating lard, the steps of contacting the lard with an interesterification catalyst and subjecting said lard while in liquid phase and in contact with said catalyst to an interesterification temperature to produce a lard in which the solid constituents of said lard crystallize in a stable form having an X-ray diffraction pattern resembling that of hydrogenated vegetable oil shortening and differing substantially from that of the unmodified lard.

KARL F. MATTIL.
FRANK A. NORRIS.

REFERENCES CITED

The following references are of record in the file of this patent:

UNITED STATES PATENTS

| Number | Name | Date |
| --- | --- | --- |
| 2,309,949 | Gooding | Feb. 2, 1943 |
| 2,571,315 | Vander Wal et al. | Oct. 16, 1951 |

FOREIGN PATENTS

| Number | Country | Date |
| --- | --- | --- |
| 249,916 | Great Britain | Mar. 30, 1926 |